United States Patent
Noetinger et al.

(10) Patent No.: US 7,426,460 B2
(45) Date of Patent: Sep. 16, 2008

(54) METHOD FOR DETERMINING ZONES IN A STRATIFIED MEDIUM WHERE THE INTERFACE BETWEEN A FLUID IN PLACE IN THE MEDIUM AND A FLUSHING FLUID MOVES IN A STATIONARY MANNER

(75) Inventors: Benoît Noetinger, Rueil Malmaison (FR); Vincent Artus, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 144 days.

(21) Appl. No.: 10/542,490

(22) PCT Filed: Jan. 15, 2004

(86) PCT No.: PCT/FR2004/000077

§ 371 (c)(1),
(2), (4) Date: Jul. 15, 2005

(87) PCT Pub. No.: WO2004/068176

PCT Pub. Date: Aug. 12, 2004

(65) Prior Publication Data

US 2006/0184347 A1   Aug. 17, 2006

(30) Foreign Application Priority Data

Jan. 16, 2003   (FR) .................................. 03 00430

(51) Int. Cl.
*G06G 7/48* (2006.01)
*G06G 7/50* (2006.01)

(52) U.S. Cl. ........................................... 703/10; 703/9

(58) Field of Classification Search ..................... 703/2, 703/10, 9
See application file for complete search history.

(56) References Cited

OTHER PUBLICATIONS

Popinet et al.; A Front-Tracking Algorithm for Accurate Representation of Surface Tension; Int. J. Numer. Meth. Fluids 30: 775-793 (1999).*

Karlsen et al.; A front-tracking approach to two-phase fluid-flow model with capillary forces; Citeseer; 1997; pp. 1-29.*

(Continued)

*Primary Examiner*—Hugh Jones
(74) *Attorney, Agent, or Firm*—Antonelli, Terry, Stout & Kraus, LLP.

(57) ABSTRACT

The invention relates to a method for determining the zones of a stratified porous medium whose physical properties are known, wherein the front or interface between fluids in place and injected flushing fluids moves in a stationary manner, without using a complete flow simulation. Starting from an a priori defined front form which separates two zones of uniform saturation, assumed to have a stationary displacement, the pressure field is determined independently in each zone. The pressure jump on either side of the front is then evaluated for any point of the interface. If it is zero, the form of the front is such that it can move in a stationary manner in the medium. If the pressure jump is not zero, the user deforms the interface and resumes the process until a stationary form is obtained. This process may not converge. In this case, we consider that a stationary front cannot form through the total thickness of the medium and the medium is divided so as to seek solutions in intermediate zones.

3 Claims, 3 Drawing Sheets

OTHER PUBLICATIONS

Sheldon et al.: "The Motion of an Interface Between Two Fluids in a Slightly Dipping Porous Medium", SPE, Society of Petroleum Engineers Inc., 1962, pp. 275-282, XP002261168 pp. 275-p. 280.

Glimm J. et al.: "Front Tracking for Petroleum Reservoir Simulation" SPE, Society of Petroleum Engineers Inc., 1983, pp. 41-49, XP002261169.

Yortsos: "Analytical Studies for Processes at Vertical Equilibrium" SPE, Society of Petroleum Engineers Inc., 1992, pp. 1-14, XP002261170, p. 1-p. 12.

Darman et al.: "Upscaling Immiscible Gas Displacements: Quantitative Use of Fine Grid Flow Data in Grid Coarsening Schemes" SPE, Society of Petroleum Engineers Inc., 2000, pp. 1-14, XP002262271, p. 1-p. 14.

English translation of the Written Opinion of the International Searching Authority.

* cited by examiner

METHOD FOR DETERMINING ZONES IN A STRATIFIED MEDIUM WHERE THE INTERFACE BETWEEN A FLUID IN PLACE IN THE MEDIUM AND A FLUSHING FLUID MOVES IN A STATIONARY MANNER

FIELD OF THE INVENTION

The present invention relates to a method for determining zones in a stratified porous medium wherein the front or interface between fluids in place and flushing fluids moves in a stationary manner, i.e. without deformation and at constant velocity.

The method finds applications notably when a stratified hydrocarbon reservoir is to be flushed by injected fluids (water for example). This determination allows to obtain very rapidly the zones that may be aggregated and form hydrodynamic units when scaling a reservoir model.

BACKGROUND OF THE INVENTION

Simulation of two-phase flows in a heterogeneous porous medium may require considerable computer resources, in particular when the numerical model of the medium considered is greatly detailed. This is notably the case in reservoir engineering, in the petroleum sphere. In order to perform a flow simulation with reasonable means, a reduced description of the reservoir is necessary. One technique consists in aggregating the grid cells of the numerical model so as to obtain a rougher grid, made up of cells with mean effective values. This technique, referred to as pseudo-function technique, was initially proposed for stratified reservoirs so as to aggregate the cells in the vertical direction by:

Coats, K. H., Nielsen, R. L. and Terhune, M. H. "*Simulation of three-dimensional, two-phase flow in oil and gas reservoirs*". SPE 1961, 1967.

This method, taken up and extended by many authors, is based on capillary vertical equilibrium or gravity equilibrium hypotheses where the capillary or gravity forces are predominant in relation to the effects due to viscosity, and the distribution of the saturations in the reservoir can be known without requiring a simulation on the precise grid (fine simulation). Mean values can be readily obtained therefrom in the vertical direction. A single mean-value layer may be eventually sufficient to describe the evolution of the saturations in the reservoir.

Another method allowing mean values to be obtained is proposed by:

Hearn, C. L. "*Simulation of stratified waterflooding by pseudo-relative permeability curve*". Journal of Petroleum Technology, pp. 805-813, July 1971.

It is based on the hypothesis of vertical equilibrium due to the viscous effects. In this case, the viscous readjustments in reservoirs are very fast in relation to the saturation variations, so that mean values can always be calculated without using fine simulation, because the fluids are propagated at constant velocity in each layer. The Hearn method, later extended, among others, by:

Simon, A. D. and Koederitz, L. F. "*An improved method for the determination of pseudo-relative permeability data for stratified systems*". SPE 10975, 1982, is based on an iterative calculation leading to arrange the reservoir layers according to the rate of propagation of the fluids in said layers. It can be shown that this iterative calculation may not converge. We then have a stationary front in at least two reservoir layers. The authors then suggest to take only one mean property layer for these particular zones. A theoretical study of the vertical equilibrium and of its implications can be found in:

Yortsos, Y. C. "*Analytical studies for processes at vertical equilibrium*". SPE 26022, 1992.

When the capillarity or the gravity cannot be considered to be predominant on the viscous effects, but the viscous vertical equilibrium cannot be reached, the methods proposed so far cannot do without a fine simulation on all or part of the reservoir to calculate the mean properties that can be assigned to the rough blocks. We then refer to dynamic pseudo-functions, which were notably introduced by:

Kyte, J. R. and Berry, D. W. "*New pseudo functions to control numerical dispersion*". SPE 5105, 1975.

These dynamic methods however pose many theoretical and practical problems. Reviews of these methods and of associated problems can be found in the following publications:

Archer, R. "*Pseudo function generation*", Master of Science thesis, Department of Petroleum Engineering of Stanford University, 1996, Ahmadi, A. "*Utilisation des proprietes equivalentes dans les modeles de réservoir: cas des écoulements diphasiques incompressibles*". Theses de Doctorat, Université de Bordeaux I, 1992, Barker, J. W. and Thibeau, S. "*A critical review of the use of pseudo relative permeabilities for upscaling*". SPE 35491, 1996.

Dynamic methods generally involve systematic and uniform aggregation of the grid cells. In order to take account of the local influences of heterogeneities on the flow, non-uniform aggregation methods were proposed, notably by:

Darman, N. H. and Durlofsky, L. J. "*Upscaling immiscible gas displacements: Quantitative Use of Fine Grid Flow Data in Grid Coarsening Schemes*". SPE 59452, 2000.

These methods have the advantage of aggregating only preferential zones and leave the parts of the reservoir with more complex hydrodynamic features in the initial state. They however cannot do without a fine simulation.

Methods allowing non-uniform aggregation of the strata of a reservoir without using a detailed simulation have been proposed. Entirely static methods such as:

Li, D. And Beckner, B. "*Optimal uplayering for scaleup of multimillion-cell geologic models*", SPE 62927, 2000 can be mentioned, or methods based on the results of a single-phase flow simulation (which is much faster than a two-phase flow simulation), such as:

Stern, D. And Dawson, A. G. "*A technique for generating reservoir simulation grids to preserve geologic heterogeneity*", SPE 51942, 1999.

Such methods, by definition, do not take account of the dynamic and viscous effects of two-phase flows.

The evolution of the front in the reservoir during the flow is considerably influenced by the viscous coupling between the pressure field and the saturation field. In particular, when the fluid injected is less viscous and consequently more mobile at the front level than the fluid in place, viscous instabilities will always favour the flow of fluids in the most permeable layers. The breakthrough time through these layers is much faster than in the rest of the reservoir. On the other hand, if the fluid injected is less mobile, the viscous coupling can slow it down in the initially faster layers, thus compensating for the permeability differences due to the stratification. A stationary front then appears.

If in at least part of the reservoir such a stationary front exists, everything goes on as if the flow encountered a single layer in the hydrodynamic sense. One can then reasonably think that a single layer with mean properties in this zone is sufficient for modelling upon numerical simulation of the flow. This is of major importance when switching from the geological reservoir model with all the layers to the simulation model, for which only the most influential zones as regards the flow are sufficient for the description.

Two problems arise then. Knowing the viscosity of the fluid injected, the existence and the location of zones where the flow is stationary has to be determined a priori, without using a complete flow simulation on the detailed model. One also has to be able, with the same constraint, to choose the viscosity of the injected fluid so that a maximum number of layers has a stationary behaviour.

The method we propose allows to recognize the zones of a stratified reservoir behaving as a single layer in the hydrodynamic sense without using a fine simulation and without involving the vertical equilibrium hypotheses. It facilitates selection of the zones to be aggregated in the stratified reservoirs. It thus allows to take account of the dynamic and viscous effects while allowing very fast determination of the coarse layers in relation to the prior solutions.

SUMMARY OF THE INVENTION

The method according to the invention allows to determine, in a stratified medium whose physical properties are known or estimated, at least one zone where an interface between a fluid in place in the medium and a flushing fluid, of known different viscosities and densities, injected in the medium, moves in a stationary manner, in order to simplify construction of a model simulating the flows in the medium. It essentially comprises the following stages:
considering an a priori interface form, assuming that the fluid displacements at any point thereof are stationary,
determining the pressure field on either side of the a priori interface,
iteratively changing the form of the interface until the pressures on either side of at least part of the interface become equal at any point of this part, and
assigning mean hydrodynamic properties uniformly to each zone of the medium delimited by each interface part, when said equalization is reached.

According to an implementation mode, when a pressure equalization cannot be obtained on either side of the interface along the latter, the interface is segmented into several parts and the form of these different parts is modified iteratively and separately, until a pressure equalization is obtained on either side thereof, the extent of each interface part, when said equalization is reached, delimiting a favourable zone to which mean hydrodynamic properties are uniformly assigned.

According to an implementation example, the form of at least one zone of the medium delimited by a stationary displacement interface is determined, which corresponds to different values of the flushing fluids viscosity, and the viscosity for which the stationary displacements in said medium are optimized is selected.

BRIEF DESCRIPTION OF THE FIGURES

Other features and advantages of the method according to the invention will be clear from reading the description hereafter of a non limitative example, with reference to the accompanying figures wherein.

DETAILED DESCRIPTION

Figure 1:
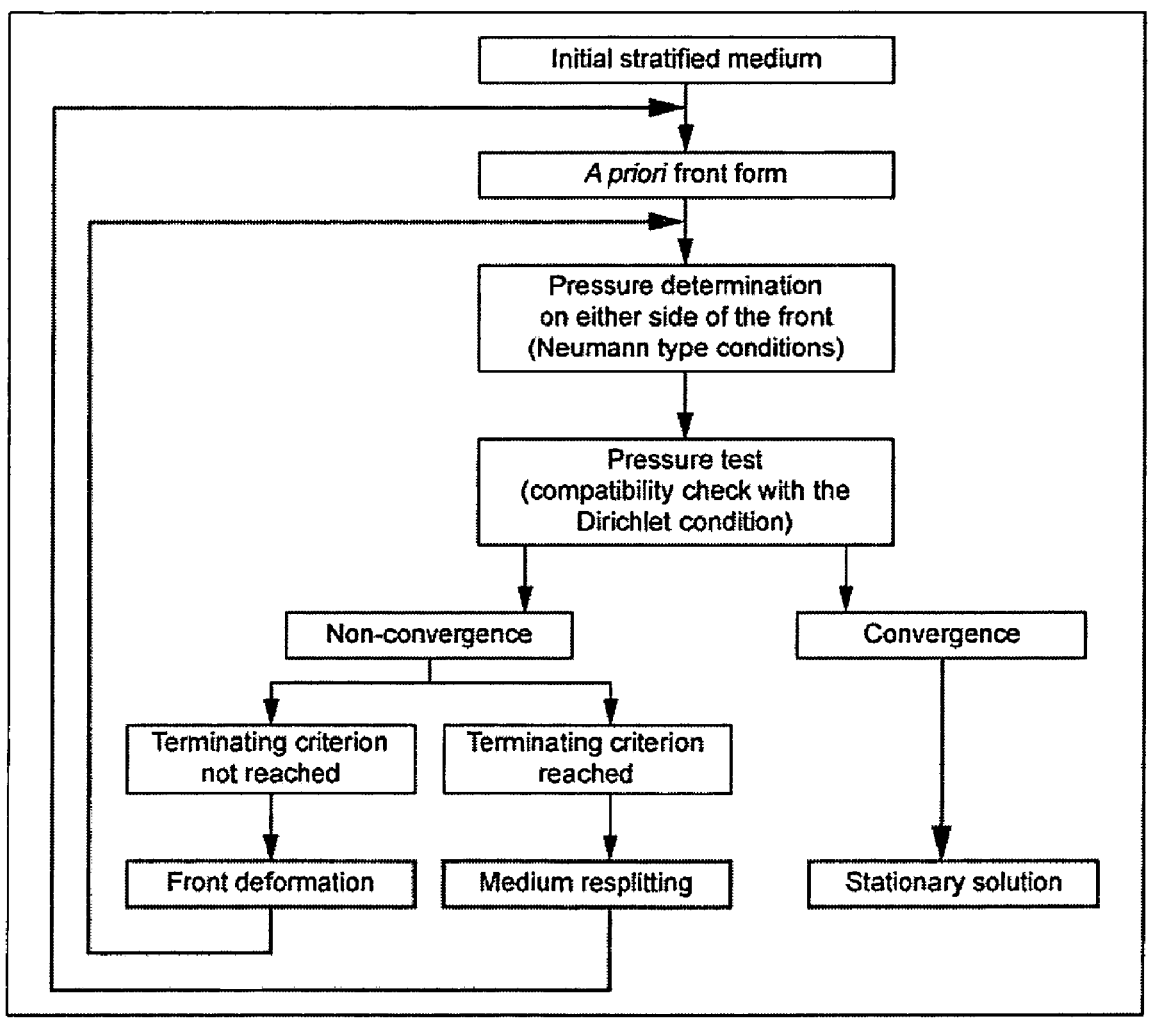
FIG. 1 shows a loop intended for iterative determination of the existence and of the form of a stationary front for a two-phase flow of known viscosity ratio in a given stratified medium.
Figure 2:
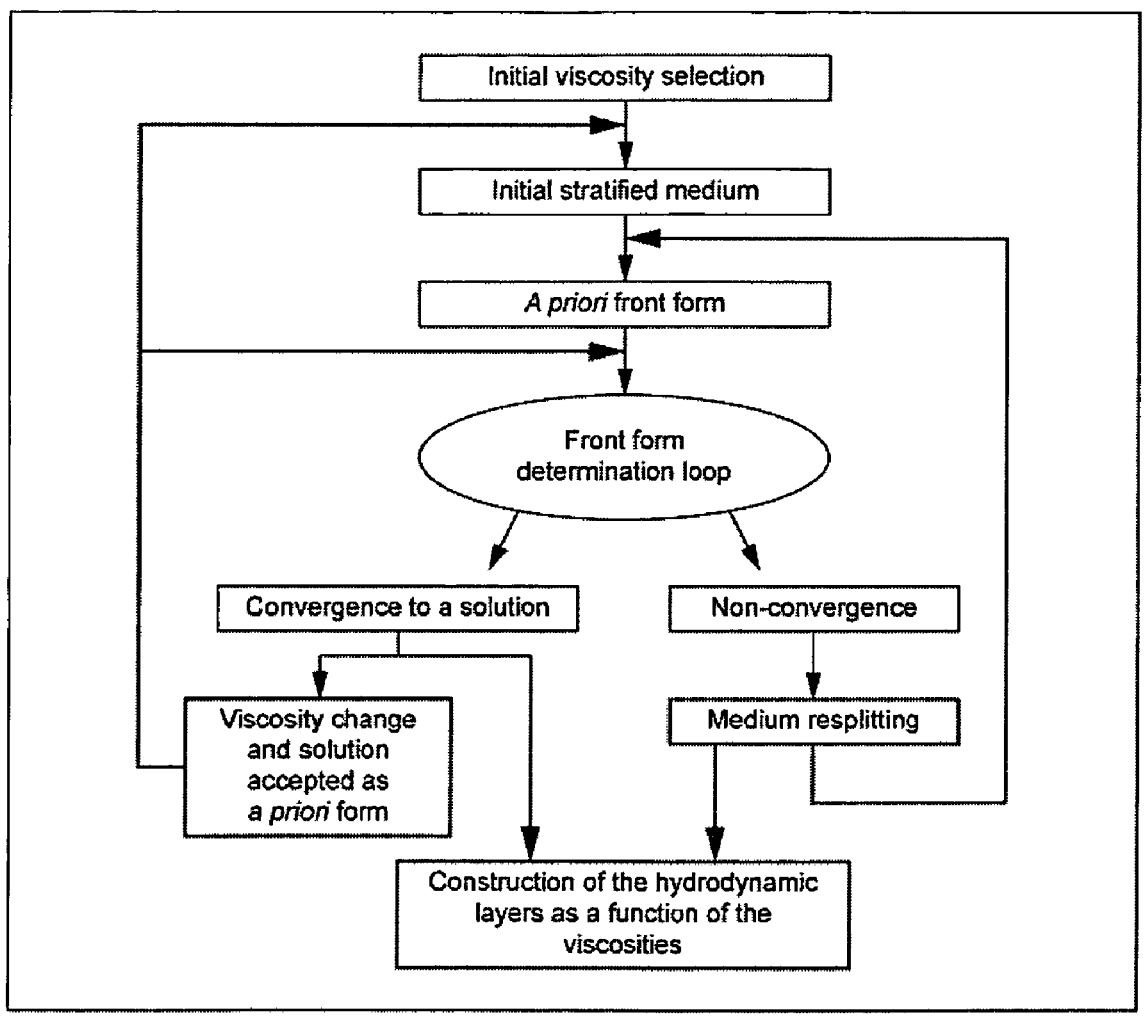
FIG. 2 shows a loop intended for construction of the evolution of the hydrodynamic layers as a function of the viscosity ratio, for two-phase flows in a given stratified medium.

We consider a flush of fluids of known viscosities in a stratified medium. Suppose that a stationary front of known form develops in the medium considered. This imposes a flow condition at the level of the interface. The flow is also known on the edges of the reservoir (where it is generally zero), at the inlet and at the outlet (where it is imposed by the injection and recovery conditions). Since the pressure is a continuous variable, the pressure jump on either side of the interface is zero at any point thereof.

We now seek the existence and the form of a stationary front in the medium. We proceed iteratively starting from an a priori front form, assuming that said form corresponds to the stationary solution. The front being assumed to be stationary, the flow is known at the interface and we therefore have a perfectly defined Neumann problem to solve for each of the two zones separated by the interface. The pressure field can therefore be solved independently in the two regions. We then evaluate the pressure jump on either side of the interface, at any point thereof. If the pressure jump is zero at any point, we then have the correct form of the front corresponding to a stationary flow. If the jump is not zero everywhere, the pressures continuity condition is not met and the front form does not correspond to a stationary solution. The interface therefore has to be deformed and the process resumed till convergence. Two cases arise then:
if convergence is reached, we then have the form of the front corresponding to a stationary solution of the flow. All the layers are crossed by the fluid at the same velocity, and the whole system behaves as a single hydrodynamic unit. It is thus possible to consider a single layer with mean properties upon scaling,
if the iterative process does not converge, it means that a stationary front cannot exist on the whole medium. Upon deformation of the front, two zones moving constantly away from one another generally appear. The medium is then divided into two parts corresponding to the previously identified zones. The process of seeking a stationary solution is then resumed in each one of these two parts. This iterative procedure eventually allows to obtain all the zones in which stationary fronts can develop, and which can be considered as hydrodynamic units.

The method can also be applied iteratively by varying the viscosity ratio of the fluids considered. We start from an injected fluid that is much more viscous than the fluid in place. A stationary solution then has to be rapidly found through the total thickness of the medium. When the viscosity ratio between the injected fluid and the fluid in place is decreased, the stationary front form, when there is one, has to be modified. The method described above is therefore taken up again to find the new front form, using as the initial front form of the iterative process the final form obtained for the previous mobility ratio. This allows much faster convergence to the stationary solution.

It is thus possible to proceed iteratively for the viscosity ratio. As this ratio is decreased, the viscous coupling will no longer be sufficient to compensate for the permeability contrasts, and a stationary solution cannot be found through the total thickness of the medium. The medium is then divided into two portions using the method described above in case of non-convergence, and the search continues in the two medium portions. By proceeding thus iteratively for the viscosity ratio, we obtain the number of hydrodynamic layers of the medium as a function of the viscosities considered. This result could for example allow to know the viscosity of the injection fluid which allows to optimize the recovery.

Figure 3:
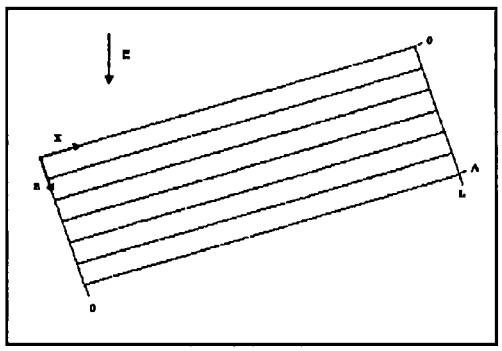
FIG. 3 shows an example of stratified reservoir inclined to the vertical. The purpose of this figure is to explain the notations used in the description of the method.

We consider a vertical section of a stratified reservoir in a direction x inclined to the horizontal (FIG. 3). The absolute permeability values are known in all the strata. The reservoir thickness is in direction z. An incompressible fluid of viscosity $\mu_1$ and of density $\rho_1$ is injected at the upstream end (x=0) at an imposed constant flow rate $Q_0$ and drives in an immiscible manner the fluid initially present in the reservoir, which is incompressible, of viscosity $\mu_2$ and of density $\rho_2$. We assume that there is no capillary pressure between the two fluids. Recovery is performed at the downstream end (x=L). The flow is zero through the top (z=0) and the sole of the reservoir (z=A). We also assume that the relative permeability curves are uniform in the reservoir and that each of these two zones is at constant saturation in the fluids considered. The zone that has not been flushed yet therefore has an irreducible saturation $S_{ir}$ in injected fluid and the flushed zone exhibits a maximum saturation $S_m$ or a front saturation $S_f$ depending on the user's hypotheses. The saturation front is arbitrarily located at the center of the reservoir, with a presupposed form corresponding to our a priori concerning the form of the stationary front. This form will be later modified until the "true" stationary solution, if there is one, is found. A free boundary problem thus has to be solved.

The boundary conditions and the stationary front condition allow to define a Neumann problem in the two zones separated by the front:

At the upstream end: the injection condition imposes a constant flow through the thickness of the reservoir at the inlet. If the medium is assumed to be sufficiently long and the saturation profile already well developed, we may assume that the pressure gradient at the system inlet is identical in all the layers:

$$\left.\frac{\partial p}{\partial x}\right|_{x=0} = \frac{\mu_1 Q_0}{\overline{K}_1} + \rho_1 g \cdot x$$

$$\left.\frac{\partial p}{\partial z}\right|_{x=0} = \rho_1 g \cdot z$$

where p is the pressure at the point considered, $\overline{K}_1$ is the mean of the effective permeabilities at the inlet over the total thickness of the medium, and $Q_0$ is the injection rate. The effective permeabilities take account of the effect of the relative permeabilities, as a function of the saturations selected by the user in the upstream and downstream zones.

At the downstream end: the incompressibility condition imposes that the flow leaving the system is the same as the incoming flow. We thus obtain a condition similar to the recovery fraction:

$$\left.\frac{\partial p}{\partial x}\right|_{x=L} = \frac{\mu_2 Q_0}{\overline{K}_2} + \rho_2 g \cdot x$$

$$\left.\frac{\partial p}{\partial z}\right|_{x=L} = \rho_2 g \cdot z$$

where $\overline{K}_2$ is the mean of the effective permeabilities at the outlet over the total thickness of the medium.

On either side of the interface: since the front is assumed to be stationary, it moves horizontally without deformation at the filtration rate $U_0$, defined such that:

$$U_0 = \frac{Q_0}{A} x$$

where x is the unit vector in the horizontal direction. This condition imposes the flow and therefore the pressure gradient on either side of the interface:

$$K_1(z) \frac{(\rho_1 g - \nabla p_1) \cdot n}{\mu_1} = K_2(z) \frac{(\rho_2 g - \nabla p_2) \cdot n}{\mu_2} = U_0 \cdot n$$

where n is the unit vector orthogonal to the interface at the point considered, $\nabla p_1$ is the pressure gradient at the interface on the upstream side and $\nabla p_2$ is the pressure gradient at the interface on the downstream side.

Pressure equation: the pressure equation is conventionally given on either side of the interface. For the downstream zone:

$$\nabla \left( \frac{K_1(z)}{\mu_1} (\rho_1 g - \nabla p) \right) = 0$$

For the upstream zone:

$$\nabla \left( \frac{K_2(z)}{\mu_2} (\rho_2 g - \nabla p) \right) = 0$$

The pressure equations and the boundary conditions allow to define for each zone on either side of the front a Neumann problem. The pressure field in each zone can thus be calculated numerically to the nearest constant for each zone. This problem is eliminated by posing the following additional condition, allowing to eliminate the constants by recalibrating the pressures along the front:

$$\int p_1(z)dz = \int p_2(z)dz = C$$

where $p_1$ and $p_2$ are the pressures evaluated at the front respectively for the upstream and downstream zones, and C is arbitrarily defined by the user and can be zero.

Once pressure p calculated in each region and recalibrated along the interface, the pressure jump $\delta p_f(z)$ through the front at any point thereof can be calculated:

$$\delta p_f(z) = p_2(z) - p_1(z) - \Delta\rho(g.x + g.z)$$

If the pressure jump is zero everywhere along the front, or at least below the critical value defined by the user, we have the form of the front corresponding to a stationary displacement. In the opposite case, the interface has to be deformed so as to decrease the pressure jumps until the stationary form is obtained. This then amounts to solving an optimization problem for which many methods are applicable.

This minimization process may not converge. In this case, there is no stationary front over the total thickness of the medium. The method described therefore has to be taken up in smaller parts of the reservoir. Stationary fronts can thus be found in several reservoir zones, moving at different velocities.

EXAMPLE

We describe here a synthetic example describing the method in a non limitative way.

Figure 4:
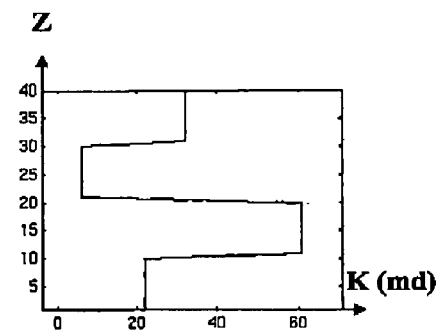
FIG. 4 shows the value of the absolute permeabilities as a function of depth, used in the synthetic reservoir example illustrating the method in a non-limitative way.

We consider a stratified reservoir with four horizontal strata of different permeabilities, shown in FIG. 4. To simplify as much as possible, the effects of gravity are disregarded and we consider that the relative permeabilities of the strata are such that the non-flushed zone is saturated in oil alone and that, upstream from the interface, only water is present at saturation S=1. The porosity is constant in the reservoir. The water is injected on the upstream face at a known constant flow rate. The viscosity of the oil is 1.

Figure 5:
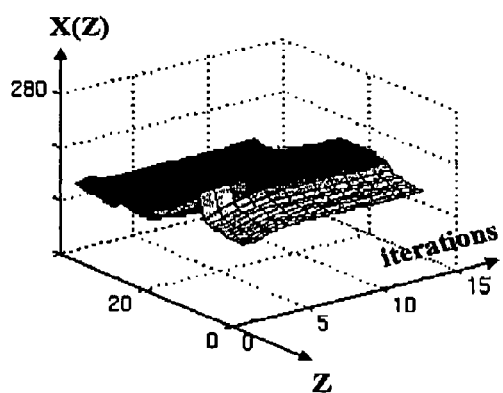
FIG. 5 shows the evolution of the interface during the iterative process of seeking the form of a stationary front, for the example described in FIG. 4.

We first seek the existence and the form of a stationary front in the medium when the viscosity of the water is 12. Since we have no a priori yet, we start from a plane interface that is iteratively deformed until convergence to a stationary solution is reached (FIG. 5).

Figure 6:
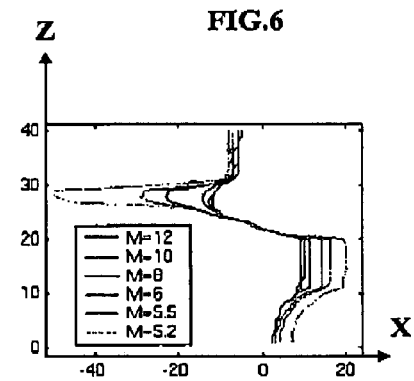
FIG. 6 shows the evolution of the stationary solution as a function of the ratio of the viscosities used, for the example described in FIG. 4.

Once the solution obtained for this viscosity, the stationary solution can be sought for a lower water viscosity, for example 10. The stationary solution obtained above can be used as a priori at the input of the iterative front deformation process. We then converge to a new solution. By proceeding thus iteratively on different water viscosity values, we obtain the forms of the stationary front associated with these values (FIG. 6). Since the mobility ratio between the fluid in place and the fluid injected decreases every time the viscosity of the water is decreased, the front spreads accordingly, because it is more and more difficult for the viscous effects to compensate for the permeability differences from one stratum to the next. When the viscosity of the water falls below the critical value 5, it can be seen that the stationary front seeking process no longer converges. The positions of the front in the second and third strata move constantly away from one another. We then consider that a stationary front cannot form over the total thickness of the medium. The latter has to be split into two parts, the separation being located between the second and the third layer. The stationary front seeking process is then continued in each one of the previously identified parts.

Figure 7:
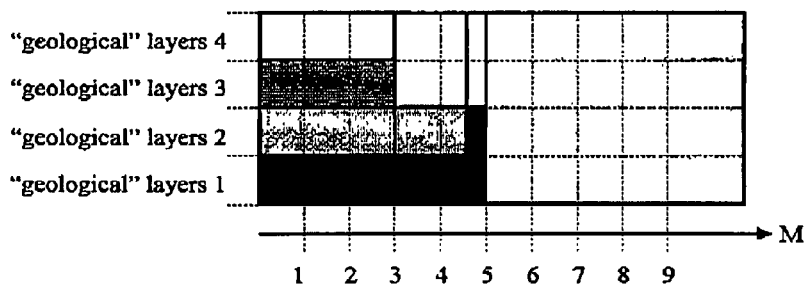
FIG. 7 shows the evolution of the number of hydrodynamic layers as a function of the ratio of the viscosities used, for the example described in FIG. 4.

This iterative procedure applied to the viscosity value of the fluid injected allows to construct a diagram representing the response of the medium from the hydrodynamic viewpoint as a function of the ratio of the mobilities M between the fluid in place and the fluid injected (FIG. 7). It can be seen in this diagram that, when the mobility ratio is above 5, the medium behaves as a single hydrodynamic layer since a stationary front exists over the total thickness thereof. When M is between 4.5 and 5, two hydrodynamic layers appear: the first one consists of the first two "geological" layers, the second of the other two "geological" layers. Then the first two geological layers divide in the hydrodynamic sense below a ratio M=4.5. We then have three layers in the hydrodynamic sense in the medium. The last two geological layers divide below M=3. We then have four hydrodynamic layers, which correspond to the four geological layers present in the medium.

The invention claimed is:

1. A method for optimizing the recovery of a hydrocarbon fluid in place in a stratified hydrocarbon reservoir, comprising constructing a reservoir model of the stratified hydrocarbon reservoir, characterized in that it comprises the following stages:

a) selecting at least one layer of the stratified hydrocarbon reservoir where an interface between the fluid in place and a flushing fluid moves in a stationary manner, the interface separating an upstream zone and a downstream zone by:

constructing an a priori interface form, assuming that the hydrocarbon fluid displacements at any point thereof are stationary, evaluating a pressure $p_1(z)$ at the interface for the urstream zone, evaluating a pressure $p_2(z)$, at the interface for the downstream zone, calculating a pressure jump at any point of the interface from the pressures $p_1(z)$ and $p_2(z)$, iteratively changing the form of the interface to minimize the pressure jump, until the jump is below a defined critical value in at least one part of the interface, the part defining the at least one layer;

b) modifying the said reservoir model by assigning mean hydrodynamic properties uniformly to the at least one layer;

c) determining a viscosity of the flushing fluid which allows to optimize the recovery, by selecting the viscosity which optimize the stationary displacements in said hydrocarbon reservoir, by using the said model; and d) injecting a flushing fluid having said viscosity into the stratified hydrocarbon reservoir to drive the hydrocarbon fluid to be recovered.

2. A method as claimed in claim 1, wherein, for lack of obtaining a pressure equalization on either side of the interface along the latter, the interface is segmented into several parts and the form of these different parts is modified iteratively and separately, until a pressure equalization is obtained on either side thereof, the extent of each interface part, when said equalization is reached, delimiting a favourable layer to which mean hydrodynamic properties are uniformly assigned.

3. A method as claimed in claim 1, wherein the flushing fluid moves horizontally and the a priori interface is a plane a priori interface.

* * * * *